(12) United States Patent
Hirose et al.

(10) Patent No.: US 12,090,649 B2
(45) Date of Patent: Sep. 17, 2024

(54) MALFUNCTION DETECTION DEVICE AND MALFUNCTION DETECTION METHOD

(71) Applicant: Nissan Motor Co., Ltd., Kanagawa (JP)

(72) Inventors: Satoru Hirose, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1008 days.

(21) Appl. No.: 17/041,517

(22) PCT Filed: Mar. 29, 2018

(86) PCT No.: PCT/JP2018/013210
§ 371 (c)(1),
(2) Date: Sep. 25, 2020

(87) PCT Pub. No.: WO2019/186885
PCT Pub. Date: Oct. 3, 2019

(65) Prior Publication Data
US 2021/0008736 A1  Jan. 14, 2021

(51) Int. Cl.
*G06N 20/00* (2019.01)
*B25J 19/00* (2006.01)

(52) U.S. Cl.
CPC .......... *B25J 19/0066* (2013.01); *G06N 20/00* (2019.01)

(58) Field of Classification Search
CPC .. B25J 19/0066; B25J 19/0062; B25J 9/1674;
G06N 20/00; G01H 1/00; G01M 13/045;
F16C 2210/04; F16C 2233/00; F16C 2322/59; G05B 2219/42271
See application file for complete search history.

(56) References Cited

U.S. PATENT DOCUMENTS

| 10,513,001 B2 | 12/2019 | Ando | |
|---|---|---|---|
| 2012/0316796 A1* | 12/2012 | Goodman | G01M 13/028 702/39 |
| 2013/0018548 A1* | 1/2013 | Shimasaki | B60L 58/20 701/36 |

(Continued)

FOREIGN PATENT DOCUMENTS

| JP | H09-328779 A | 12/1997 |
|---|---|---|
| JP | 2004-20378 A | 1/2004 |
| JP | 2007-219991 A | 8/2007 |

(Continued)

OTHER PUBLICATIONS

Ohta, Hiroyuki, et al. "Effects of grease characteristics on sound and vibration of a linear-guideway type recirculating ball bearing." Journal of Tribology 138.2 (2016): 021101 (Year: 2016).*

(Continued)

*Primary Examiner* — Andrew T McIntosh
(74) *Attorney, Agent, or Firm* — Osha Bergman Watanabe & Burton LLP

(57) ABSTRACT

A malfunction detection device compares detected data on a condition at a predetermined part of an apparatus with a threshold so as to determine a malfunction of the apparatus. The malfunction detection device varies the threshold in accordance with a type of a lubricant used for movable parts of the apparatus.

4 Claims, 11 Drawing Sheets

(56) References Cited

U.S. PATENT DOCUMENTS

2015/0177219 A1\* 6/2015 Ohnuma .............. G01N 21/251
356/70
2016/0184988 A1\* 6/2016 Zhuan ............... H01L 21/67766
73/649

FOREIGN PATENT DOCUMENTS

| JP | 2016-118498 A | 6/2016 |
| JP | 2018-25450 A | 2/2018 |
| JP | 2018-44892 A | 3/2018 |

OTHER PUBLICATIONS

Itagaki, Takayoshi, Hiroyuki Ohta, and Teruo Igarashib. "Effect of grease type on abnormal vibration of ball bearing." Journal of sound and vibration 268.5 (2003): 933-946 (Year: 2003).\*

Carvalho Bittencourt, André. "Friction change detection in industrial robot arms." (2007) (Year: 2007).\*

Márton, Lőrinc. "Actuator fault diagnosis in mechanical systems—Fault power estimation approach." International Journal of Control, Automation and Systems 13 (2015): 110-119 (Year: 2015).\*

Bittencourt, André Carvalho, and Patrik Axelsson. "Modeling and experiment design for identification of wear in a robot joint under load and temperature uncertainties based on friction data." IEEE/ASME transactions on mechatronics 19.5 (2013): 1694-1706 (Year: 2013).\*

\* cited by examiner

| TYPE OF GREASE | THRESHOLD |
|---|---|
| A | TH1 |
| B | TH2 |
| C | TH3 |

FIG. 6

| VISCOSITY RANGE OF GREASE / TYPE OF GREASE | L | M | N |
|---|---|---|---|
| A | TH11 | TH12 | TH13 |
| B | TH21 | TH22 | TH23 |
| C | TH31 | TH32 | TH33 |

FIG. 9

| TYPE OF GREASE | LEANING MODEL |
|---|---|
| A | P1 |
| B | P2 |
| C | P3 |

| DATE | NORMAL | | | MALFUNCTION | | |
|---|---|---|---|---|---|---|
| | t | w | e | t | w | e |
| JANUARY 10 | 6.5 | 14.9 | 3.25 | – | – | – |
| JANUARY 11 | – | – | – | 7.8 | 16.3 | 5.1 |
| ⋮ | ⋮ | ⋮ | ⋮ | ⋮ | ⋮ | ⋮ |

MALFUNCTION DETECTION DEVICE AND MALFUNCTION DETECTION METHOD

TECHNICAL FIELD

The present invention relates to a malfunction detection device and a malfunction detection method.

BACKGROUND ART

An abnormal-load detection device is disclosed that determines an occurrence of a malfunction when a rotational speed of a servomotor is greater than a reference speed and when disturbance torque is smaller than reference torque.

CITATION LIST

Patent Literature

Patent Document 1: Japanese Unexamined Patent Application Publication No. 2007-219991

SUMMARY OF INVENTION

Technical Problem

Any conventional technique does not disclose how to detect a malfunction of a detection target apparatus, when including a movable part (such as a motor or a speed reducer), in view of a type of a lubricant used for the movable part.

In view of the foregoing problem, the present invention provides a malfunction detection device and a malfunction detection method capable of detecting a malfunction of an apparatus in accordance with determination criteria corresponding to a type of a lubricant used for a movable part.

Technical Solution

A malfunction detection device according to an aspect of the present invention compares data on a condition at a part of an apparatus provided with a movable part with a threshold to determine a malfunction of the apparatus. The malfunction detection device varies the threshold in accordance with a type of a lubricant used for the movable part.

Advantageous Effects

The present invention can detect a malfunction of the apparatus in accordance with determination criteria corresponding to the type of the lubricant used for the movable part of the apparatus.

BRIEF DESCRIPTION OF DRAWINGS

FIG. 6 is a diagram illustrating information stored in a storage unit 18 in a second example.

FIG. 9 is a diagram illustrating information stored in a storage unit 18 in the third example.

FIG. 10 is a diagram illustrating an example of a learning model P 1.

DESCRIPTION OF EMBODIMENTS

Figure 1:
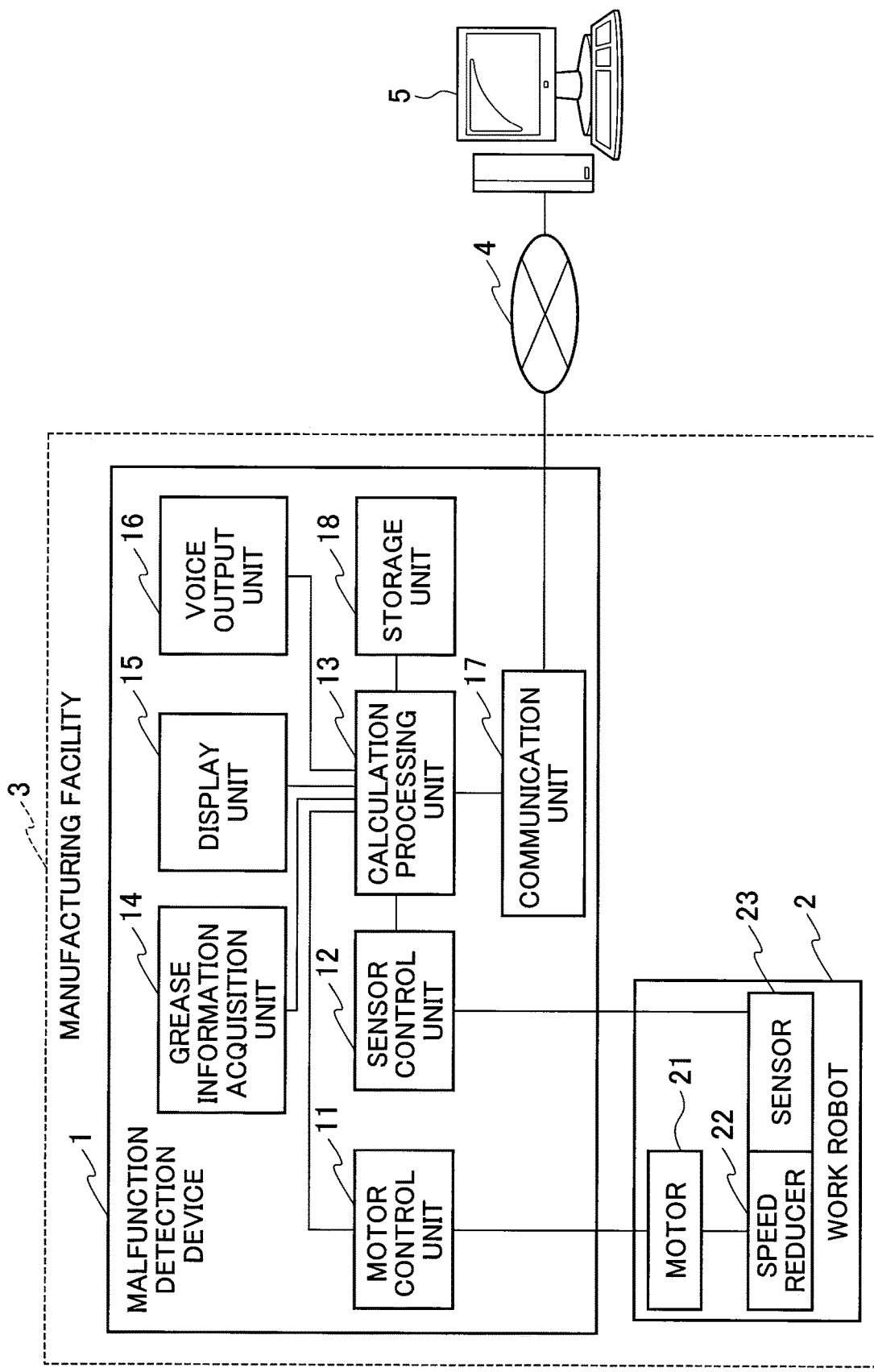
FIG. 1 is a diagram illustrating a configuration of a system including a malfunction detection device in a first example.

An embodiment will be described below with reference to the drawings. The same elements illustrated in the drawings are indicated by the same reference numerals, and overlapping explanations are not made below.

The following embodiment is illustrated with a technique that detects a malfunction of an apparatus such as a work robot (such as a welding robot) which is a multi-axis machine for assembling a vehicle, for example.

A rotating axis of the multi-axis machine can be provided with a motor and a speed reducer (both are rotating mechanisms) as movable parts, in which the motor generates a component of unnecessary driving force (disturbance torque), and the speed reducer causes considerable vibrations. A malfunction of the multi-axis machine thus can be determined in accordance with a magnitude of an acceleration derived from the disturbance torque or the vibrations.

The movable parts can be filled with grease. The grease is referred to also as a lubricant depending on the degree of viscosity. The embodiment is illustrated with a case in which the grease and the lubricant are synonymous. The following explanations use the word "grease" for illustration purposes.

The magnitude of the disturbance torque or the acceleration varies depending on the type of grease (such as a manufacturer or a model number of the grease). For example, some types of grease relatively increase the disturbance torque or the acceleration, but the increase in the disturbance torque or the acceleration, which is derived from the type of grease used, does not necessarily indicate that the multi-axis machine has a malfunction. Determining a malfunction not according to the type of grease but simply by comparing the data of the disturbance torque or the acceleration with a predetermined threshold may lead to a wrong result that the multi-axis machine has a malfunction.

In addition, an alarm, which is presumed to be given upon a malfunction, may be raised even though the apparatus does not have any malfunction, resulting in a false alarm.

The use of grease of another type can relatively decrease the disturbance torque or the acceleration. However, determining a malfunction not according to the type of the grease, but simply by comparing the data of the disturbance torque or the acceleration with a predetermined threshold may miss the occurrence of a malfunction.

In view of the above problems, the embodiment is illustrated below with a technique capable of avoiding raising a false alarm derived from a wrong determination and preventing an occurrence of a malfunction from being missed.

First Example

FIG. 1 is a diagram illustrating a configuration of a system including a malfunction detection device in a first example.

The malfunction detection device 1 is a device for detecting a malfunction of an apparatus, in particular, detecting a malfunction of a target apparatus such as a work robot 2 of a multi-axis machine for assembling a vehicle, for example. The multifunction detection device 1 and the work robot 2 are installed in a manufacturing facility 3, while the malfunction detection device 1 is connected to a computer 5 via a communication line 4.

The work robot 2 is an apparatus including a motor 21 serving as a movable part and a speed reducer 22 serving as a movable part for converting a torque of the motor 21 to a higher torque to move an object having a heavy load by, for example, an arm of the work robot 2. The motor 21 is a driving mechanism of the work robot 2. The speed reducer 22 is typically used for a factory work robot.

A sensor 23 is arranged at a part adjacent to the speed reducer 22 so as to detect an acceleration as a magnitude of vibrations of the part. The sensor 23 detects the acceleration of the arranged part of the sensor 23, and outputs an acceleration signal indicating the detected acceleration in real time. The acceleration signal can be a signal indicating a condition of the speed reducer 22 as a component of the apparatus (2). The sensor 23 is not limited to the sensor for detecting the acceleration, and may be a sensor capable of detecting a condition at a predetermined part of the apparatus. For example, a sensor can be used that detects a velocity or a displacement at a predetermined part so as to detect a magnitude of vibrations as the condition of the corresponding part. Various types of sensors capable of acquiring a change in attitude in a time-series manner may be used, such as a piezoelectric sensor, an angular velocity sensor, and a gyro sensor.

Figures 2, 3:
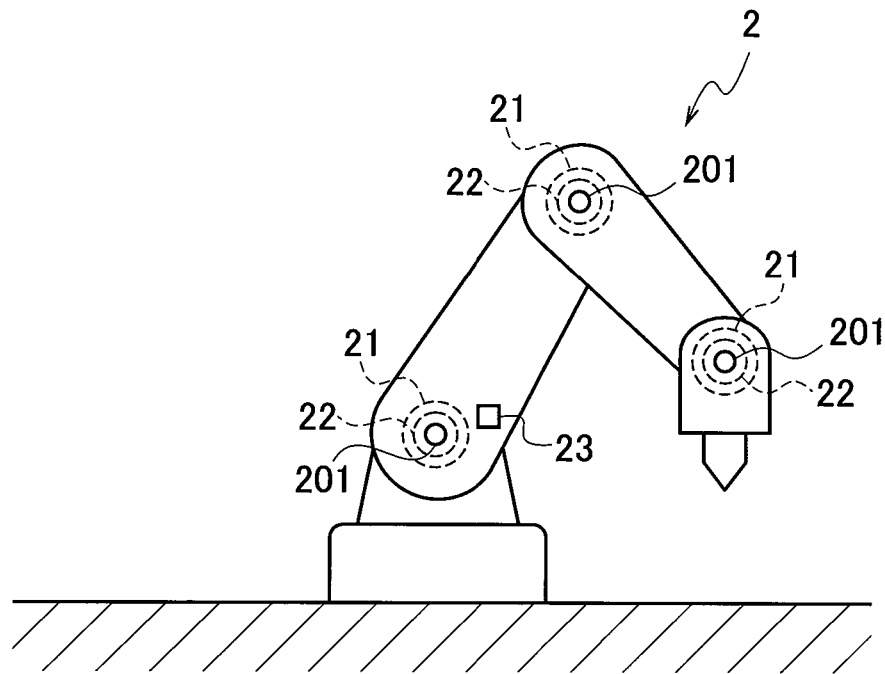
FIG. 2 is a diagram illustrating an arrangement example of a sensor 23 in a work robot 2.
FIG. 3 is a diagram illustrating information stored in a storage unit 18 in the first example.

FIG. 2 is a diagram illustrating an arrangement example of the sensor 23 in the work robot 2.

The work robot 2 includes three rotating axes (movable axes) 201, for example, each being provided with the motor 21 and the speed reducer 22. The motor and the speed reducer are typically installed at each of the plural movable axes of the work robot. The sensor 23 is arranged adjacent to the speed reducer 22 provided in one of the rotating axes 201, for example. The sensor 23 is arranged adjacent to the speed reducer 22, which is not easy to replace as compared with the motor 21, so as to detect a malfunction of the speed reducer 22 at an early stage. The arrangement of the sensor 23 is not limited to the position adjacent to the speed reducer 22, and the sensor 23 may be arranged at any optional part in the work robot 2 (the apparatus) at which vibrations should be detected.

The explanations are further made below while returning to FIG. 1.

The malfunction detection device 1 includes a motor control unit 11, a sensor control unit 12, a calculation processing unit 13, a grease information acquisition unit 14, a display unit 15, a voice output unit 16, a communication unit 17, and a storage unit 18.

The malfunction detection device 1 includes a general-purpose microcomputer (referred to also as a control unit) including a central processing unit (CPU), a memory, and an input-output unit. A computer program (a malfunction detection program) is installed on the microcomputer so as to function as the malfunction detection device. The microcomputer functions as a plurality of information processing circuits (11 to 14 and 17) included in the malfunction detection device when the computer program is executed. While the embodiment is illustrated with the case in which the software is installed to fabricate the information processing circuits (11 to 14 and 17) included in the malfunction detection device, dedicated hardware for executing each information processing as described below can be prepared to compose the information processing circuits (11 to 14 and 17). The respective information processing circuits (11 to 14 and 17) may be composed of individual hardware.

The motor control unit 11 stores and outputs a level, a time, and a timing of a current flowing through the motor 21 during operation so as to control the motor 21 to cause the work robot 2 to perform a predetermined action. The motor control unit 11 also rotates (operates) the motor 21 in accordance with instruction values of a rotational speed and a torque. The operation of the motor 21 causes the speed reducer 22 to operate together. Namely, the motor 21 and the speed reducer 22 operating together cause the work robot 2 to move a welding machine, for example, attached to the tip of the arm of the work robot 2 to a predetermined position so as to perform a welding operation.

The motor control unit 11 generates a driving force signal indicating a driving force caused by a disturbance in the motor 21 due to the current flowing through the motor 21, which is a magnitude of a fluctuation component (also called a disturbance torque) with respect to the instruction value of the torque (hereinafter referred to as a driving force), and outputs the signal to the calculation processing unit 13. The driving force signal can be a signal indicating the condition of the motor 21 as a component of the apparatus (2).

The sensor control unit 12 controls the speed reducer 22, and causes the sensor 23 to detect the acceleration derived from the vibrations of the speed reducer 22 during operation. The sensor control unit 12 then receives the acceleration signal indicating the acceleration of the speed reducer 22 from the sensor 23, and transfers the signal to the calculation processing unit 13.

The calculation processing unit 13 is a control unit which calculates data on a condition at a part detected in the apparatus (2) provided with the movable parts (the motor 21 and the speed reducer 22) described above so as to detect a malfunction of the apparatus according to the data on the condition. The calculation processing unit 13 herein calculates the data on the condition according to at least one of the acceleration signal and the driving force signal, and detects a malfunction of the work robot 2 in accordance with the data. The calculation processing unit 13 thus detects a malfunction only in accordance with the acceleration signal, detects a malfunction only in accordance with the driving force signal, or detects a malfunction in accordance with both of the acceleration signal and the driving force signal. The following case is presumed to detect a malfunction of the work robot 2 only in accordance with the acceleration signal. The acceleration signal is referred to below as a sensor signal. The sensor signal is referred to also as measurement data.

In particular, the calculation processing unit 13 compares the data on the condition at a predetermined part in the work robot 2 (the apparatus) with a predetermined threshold so as to detect a malfunction of the apparatus. When the data on the condition is greater than the threshold, the work robot 2 is determined to have a malfunction. The calculation processing unit 13 detects the values of the sensor signals in a predetermined period of time, and calculates an average of the values. When the average is greater than a predetermined threshold (simply referred to below as a threshold), the work robot 2 is determined to have a malfunction.

The average described above is a comparison target value for the threshold, and is referred to below as a comparison target value S. The comparison target value S is not limited to the average, and may be a maximum value or a minimum value, or may be calculated by use of a standard deviation or frequency characteristics of the sensor signals. The comparison target value S is only required to indicate a physical quantity referring to the characteristics of the sensor signals.

A malfunction of the work robot 2 can be detected in accordance with the driving force signal instead of the acceleration signal. The detection of a malfunction of the work robot 2 may also be made in accordance with the combination of the acceleration signal and the driving force signal. The sensor signal, which indicates the condition at a predetermined part of the apparatus, is not limited to the acceleration signal or the driving force signal, and is only required to be output from the sensor provided in the corresponding part of the apparatus. For example, a temperature (the condition) around the motor 21 or the speed reducer 22 may be detected by the sensor so as to be used as the sensor signal. Alternatively, the current (the condition) flowing through the motor 21 may be detected so as to be used as the sensor signal.

The grease information acquisition unit 14 acquires information on grease used for the speed reducer 22 of the work robot 2, for example (referred to below as "grease information"). The grease information acquisition unit 14 acquires the grease information from a device for inputting a name of grease, a model number, a used amount, and a date of change of grease to the work robot 2 or a maintenance record upon the change of grease, for example. Alternatively, the grease information acquisition unit 14 acquires the grease information from the maintenance record or the work robot 2. The first example is illustrated with a case in which the grease information includes the type of grease. The type of grease is herein classified into three which are type A, type B, and another type (referred to as type C for illustration purposes) other than type A or type B. Each type of grease is classified by the name or the model number of grease. The classification of grease is not limited to three, and the grease may be classified into any number of types that can be used for the work robot 2.

The display unit 15 displays the result of determination of whether the work robot 2 has a malfunction, and the type of grease (hereinafter, collectively referred to as a measurement result 150) in real time, and is a liquid crystal monitor, for example.

The voice output unit 16 notifies an operator of a malfunction with an alarm sound or vibration (including the outside of a range of audibility) when the work robot 2 is determined to have a malfunction, and is a speaker, for example.

The communication unit 17 sends the measurement result 150 to the computer 5 located in a remote place (the outside), and is a router in a wired LAN or a wireless (such as Wi-Fi) router, for example.

The storage unit 18 stores a threshold for each type of grease. In particular, the storage unit 18 stores a threshold adapted for the detection of a malfunction when the corresponding type of grease is used. The threshold varies depending on the manufacturer of grease (the type of grease), for example.

FIG. 3 is a diagram illustrating the information stored in the storage unit 18 in the first example.

The storage unit 18 in the first example stores a threshold TH1 in association with the grease of type A, a threshold TH2 in association with the grease of type B, and a threshold TH3 in association with the grease of type C. The respective thresholds are set for the corresponding types of grease, and differ from each other.

When the comparison target value S when using the grease of type B is greater than the comparison target value S when using the grease of type A, the threshold TH2 is greater than the threshold TH1. When the comparison target value S when using the grease of type C is greater than the comparison target value S when using the grease of type B, the threshold TH3 is greater than the threshold TH2. The threshold is greater when set for the corresponding type of grease with the greater comparison target value S, and the threshold is smaller when set for the corresponding type of grease with the smaller comparison target value S.

Although not illustrated, the storage unit 18 stores the reason for a malfunction caused in the work robot 2 and the data on the driving force signal and the acceleration signal upon the occurrence of the malfunction, and outputs the information to the calculation processing unit 13 as necessary.

The explanations are further made below while returning to FIG. 1.

The computer 5 is used by an observing person or a maintenance person who observes the work robot 2 in the remote place, and receives and displays the measurement result 150 to notify the observing person of the result of the malfunction detection with an image, sound, voice, or vibration.

Figure 4:
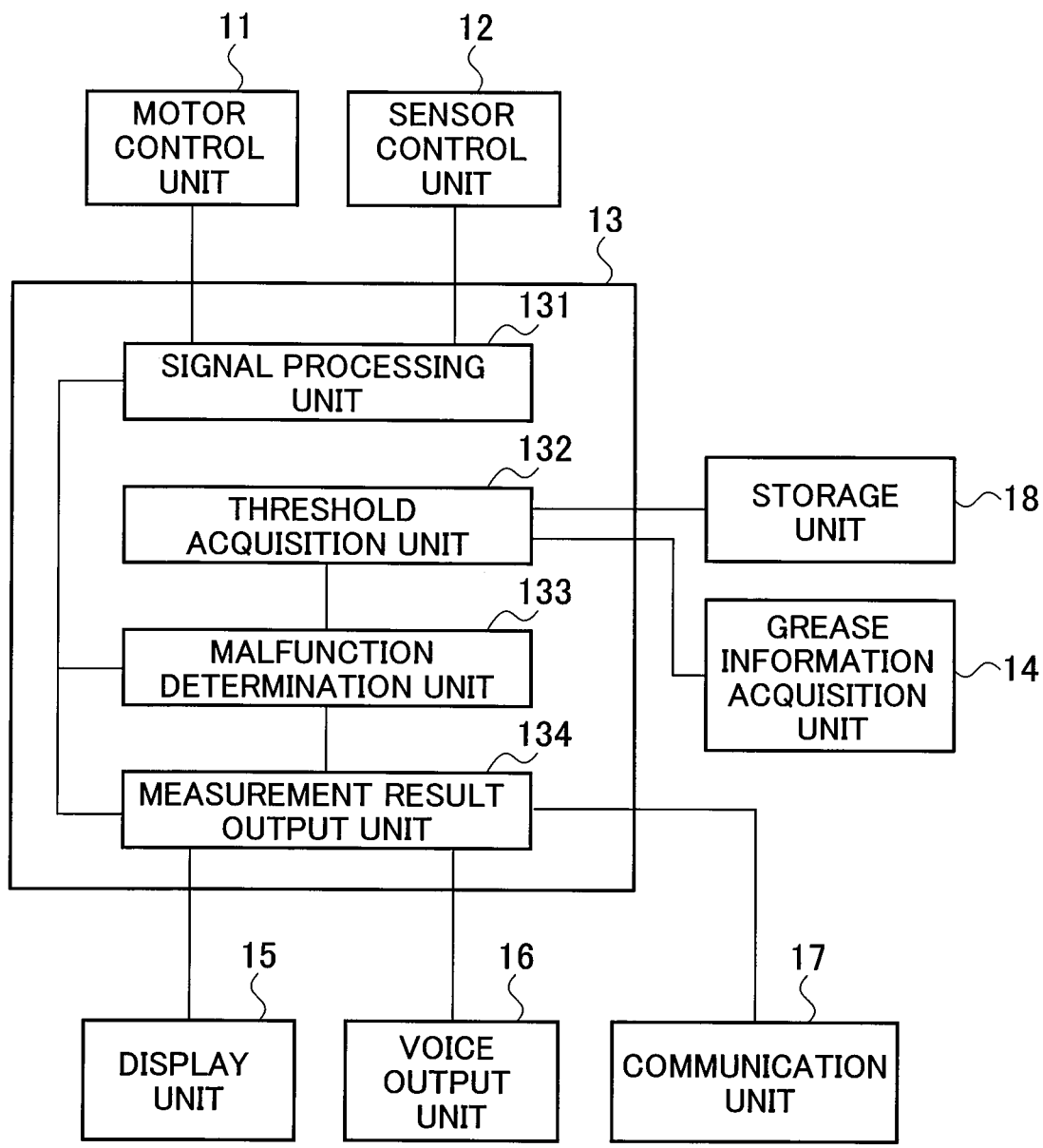
FIG. 4 is a block diagram illustrating a schematic configuration of a calculation processing unit 13 in the first example.

FIG. 4 is a block diagram illustrating a schematic configuration of the calculation processing unit 13.

The calculation processing unit 13 includes a signal processing unit 131, a threshold acquisition unit 132, a malfunction determination unit 133, and a measurement result output unit 134.

The signal processing unit 131 receives the sensor signals from the motor control unit 11 and the sensor control unit 12, and calculates the comparison target value S from the sensor signals. The threshold acquisition unit 132 acquires the grease information from the grease information acquisition unit 14, and acquires the threshold set for the corresponding type of the grease included in the grease information from the storage unit 18.

The malfunction determination unit 133 determines a malfunction of the work robot 2 by comparing the comparison target value S with the threshold. The malfunction determination unit 133 compares the comparison target value S with the threshold so as to determine whether the work robot 2 has a malfunction.

The measurement result output unit 134 displays the measurement result 150, including the result of determination of whether the work robot 2 has a malfunction, on the display unit 15. The measurement result output unit 134 causes the voice output unit 16 to produce an alarm sound or vibration when the work robot 2 is determined to have a malfunction. The measurement result output unit 134 outputs the measurement result 150 to the communication unit 17.

Figure 5:
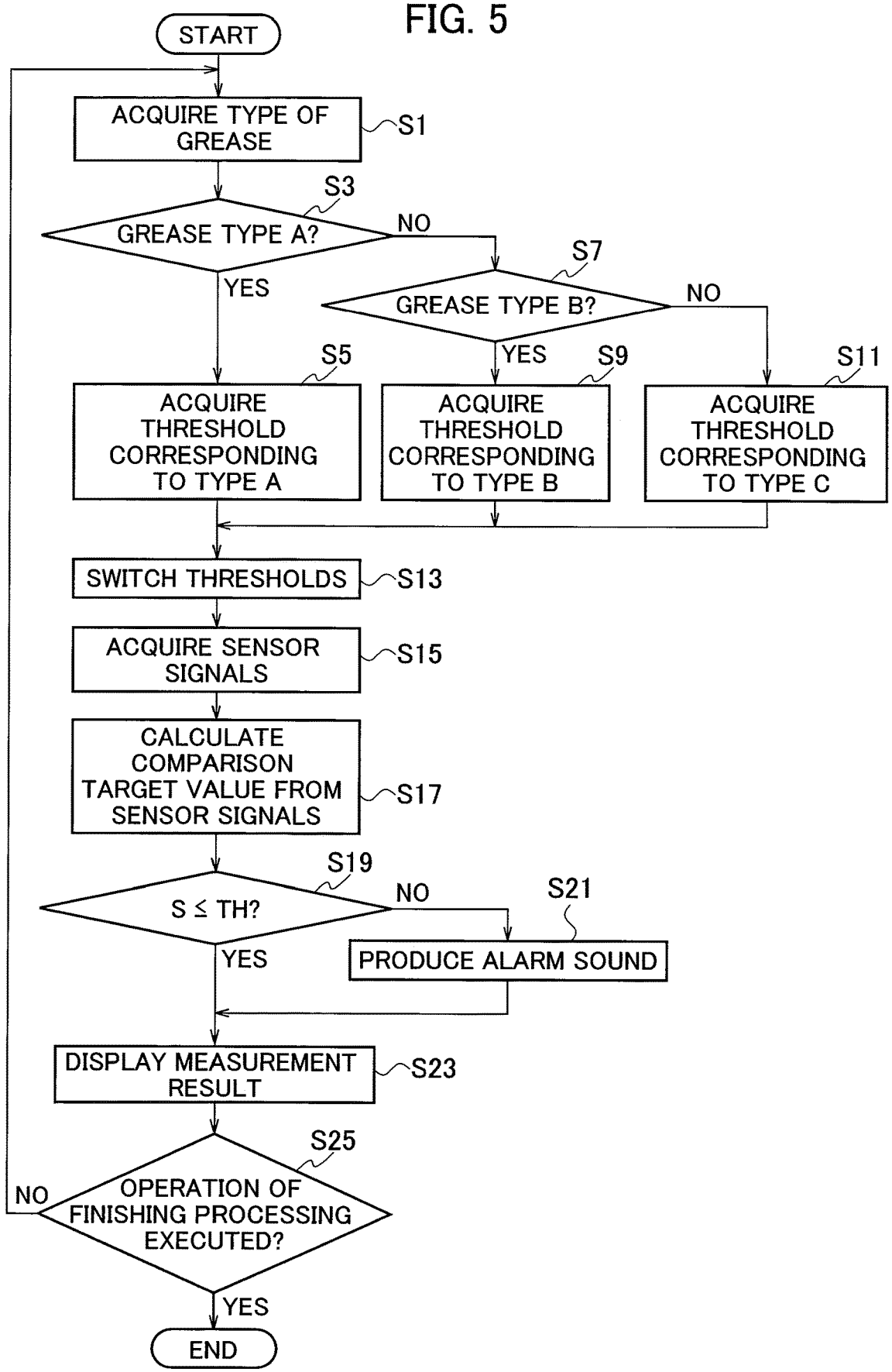
FIG. 5 is a flowchart showing a process performed by the calculation processing unit 13 in the first example.

FIG. 5 is a flowchart illustrating a process performed by the calculation processing unit 13 in the first example.

The threshold acquisition unit 132 of the calculation processing unit 13 first acquires the grease information from the grease information acquisition unit 14. The threshold acquisition unit 132 acquires the type of grease, which is included in the grease information (S1).

The threshold acquisition unit 132 then determines whether the type of the grease acquired is type A (S3). The threshold acquisition unit 132 acquires the threshold corresponding to type A (S5) when the type of the grease acquired is type A (S3: YES).

When the type of the grease acquired is not type A (S3: NO), the threshold acquisition unit 132 then determines whether the type of the grease acquired is type B (S7). The threshold acquisition unit 132 acquires the threshold corresponding to type B (S9) when the type of the grease acquired is type B (S7: YES). When the type of the grease acquired is not type B (S7: NO), the threshold acquisition unit 132 then determines whether the type of the grease acquired is type C (S11).

The threshold acquisition unit 132, which stores the threshold used in the previous malfunction determination, switches the threshold previously used to the threshold acquired in step S5, S9, or S11 (referred to below as "threshold TH") (S13).

The signal processing unit 131 receives the sensor signals from the motor control unit 11 and the sensor control unit 12 (S15), and calculates the comparison target value S from the sensor signals (S17).

The malfunction determination unit 133 then determines whether the comparison target value S is equal to or smaller than the threshold TH (S19). The malfunction determination unit 133 determines that the work robot 2 (in particular, the motor 21 and the speed reducer 22) does not have a malfunction when the comparison target value S is equal to or smaller than the threshold TH (S19: YES).

When the comparison target value S is greater than the threshold TH (S19: NO), the work robot 2 (in particular, the motor 21 and the speed reducer 22) is determined to have a malfunction. The measurement result output unit 134 causes the voice output unit 16 to produce an alarm sound or vibration so as to notify the operator of the occurrence of the malfunction (S21).

The process proceeds to step S23 after the processing in step S21 or when the comparison target value S is equal to or smaller than the threshold TH (S19: YES).

In step S23, the measurement result output unit 134 displays the measurement result 150 including the determination result in step S19 (the result of the malfunction detection) on the display unit 15 (S23). The measurement result output unit 134 outputs the measurement result 150 to the communication unit 17.

The display unit 15 displays the information that the movable parts have a malfunction (S23) when the comparison target value S is greater than the threshold TH (S19: NO). The display unit 15 displays the information that the movable parts are in a normal state (S23) when the comparison target value S is equal to or smaller than the threshold TH (S19: YES).

The communication unit 17 sends the measurement result 150 to the computer 5 (S23). The computer 5 displays the measurement result 150. The computer 5 also produces sound, voice, or vibration when the work robot 2 has a malfunction. The observing person and the maintenance person can confirm the determination of whether the work robot 2 has a malfunction through the measurement result 150 and the produced voice, sound, or vibration.

Next, the operator in the manufacturing facility 3 is determined whether to perform the operation for finishing the process on the malfunction detection device 1 (S25). The process returns to step S1 when the operation is not performed yet, and the process ends when the operation has been performed.

According to the first example described above, the malfunction detection device 1 includes the control unit (13) for detecting a malfunction of the apparatus (2) in accordance with the data (S) on the condition detected at a predetermined part in the apparatus provided with the movable parts (21, 22). The control unit compares the data (S) on the detected condition with the predetermined threshold (S19) so as to determine a malfunction of the apparatus. The control unit (13) acquires the type of grease (lubricant) used for the movable parts in the apparatus (S1), and changes the threshold depending on the type of the lubricant acquired (S13). Namely, the control unit sets the threshold changed depending on the type of the lubricant. A malfunction of the apparatus thus can be detected in accordance with the determination criteria set for the corresponding type of the lubricant used for the movable parts in the apparatus. A malfunction detection method performed by the malfunction detection device 1 can also achieve the similar effects.

If a constant threshold is used, the apparatus in the normal state could be determined to have a malfunction to lead to a wrong result when the size of the data (S) increases due to the use of the corresponding type of grease. Increasing the threshold thus can prevent such a wrong determination. This further prevents the alarm used in step S21, which is to be given when the apparatus has a malfunction, from being raised when the apparatus is in the normal state, avoiding a false alarm accordingly.

The use of a constant threshold may also lead to a wrong result that the apparatus causing a malfunction is determined to be in the normal state when the size of the data (S) decreases due to the use of the corresponding type of grease. Decreasing the threshold thus can prevent such a wrong determination. This prevents the occurrence of a malfunction from being missed.

Determining a malfunction of the apparatus in accordance with a combination of the torque indicated by the driving force signal and a value other than the torque (for example, a value of vibrations indicated by the acceleration signal), enables the detection of a malfunction of the apparatus with a higher accuracy than a case of the determination only based on the torque.

Second Example

A second example is described below. The elements different from those in the first example are mainly described below, and overlapping explanations of the same or similar contents are not repeated below.

The second example is illustrated with a case of using a value regarding viscosity of grease, in addition to the type of grease, and using a threshold corresponding to a combination of the type of grease and the viscosity of grease. In particular, the second example uses a threshold adapted for the grease of a particular type having particular viscosity. The second example is illustrated below with a case presumed to be capable of choosing the viscosity of grease varying depending on the component or the content by percentage, among the grease of the same model number, namely, the same type. The second example thus uses the grease information including the type and the viscosity of grease. The term "viscosity" as used herein is not limited to a term expressed directly by a value of viscosity itself, but encompasses any terms having the same meaning.

The second example is illustrated below with a case presumed to set two upper and lower boundary values of viscosity regardless of the type of grease so as to be divided into three ranges of viscosity. In particular, the range of viscosity lower than or equal to the lower boundary value (referred to as a boundary value α) is referred to as a viscosity range L, the range of viscosity greater than the lower boundary value α and lower than or equal to the higher boundary value (referred to as a boundary value β) is referred to as a viscosity range M, and the range of viscosity greater than the higher boundary value β (>α) is referred to as a viscosity range N. The degree of viscosity herein is thus given by L<M<N. The boundary values may be changed depending on the type of grease, instead of the case in which the boundary values are commonly used regardless of the type of grease. The range of viscosity may be divided into two ranges, or may be divided into four or greater ranges.

FIG. 6 is a diagram illustrating information stored in the storage unit 18 in the second example.

The storage unit 18 in the second example stores a threshold TH11 in association with the combination of the grease of type A and the viscosity range L. The storage unit 18 stores a threshold TH12 in association with the combination of the grease of type A and the viscosity range M. The storage unit 18 stores a threshold TH13 in association with the combination of the grease of type A and the viscosity range N.

The storage unit 18 also stores a threshold TH21 in association with the combination of the grease of type B and the viscosity range L. The storage unit 18 stores a threshold TH22 in association with the combination of the grease of type B and the viscosity range M. The storage unit 18 stores a threshold TH23 in association with the combination of the grease of type B and the viscosity range N.

The storage unit 18 also stores a threshold TH31 in association with the combination of the grease of type C and the viscosity range L. The storage unit 18 stores a threshold TH32 in association with the combination of the grease of type C and the viscosity range M. The storage unit 18 stores a threshold TH33 in association with the combination of the grease of type C and the viscosity range N.

The storage unit 18 in the second example sets the threshold to be greater for the corresponding combination of the type of grease and the viscosity range which leads to the greater comparison target value S, and sets the threshold to be smaller for the corresponding combination of the type of grease and the viscosity range which leads to the smaller comparison target value S.

Figure 7:
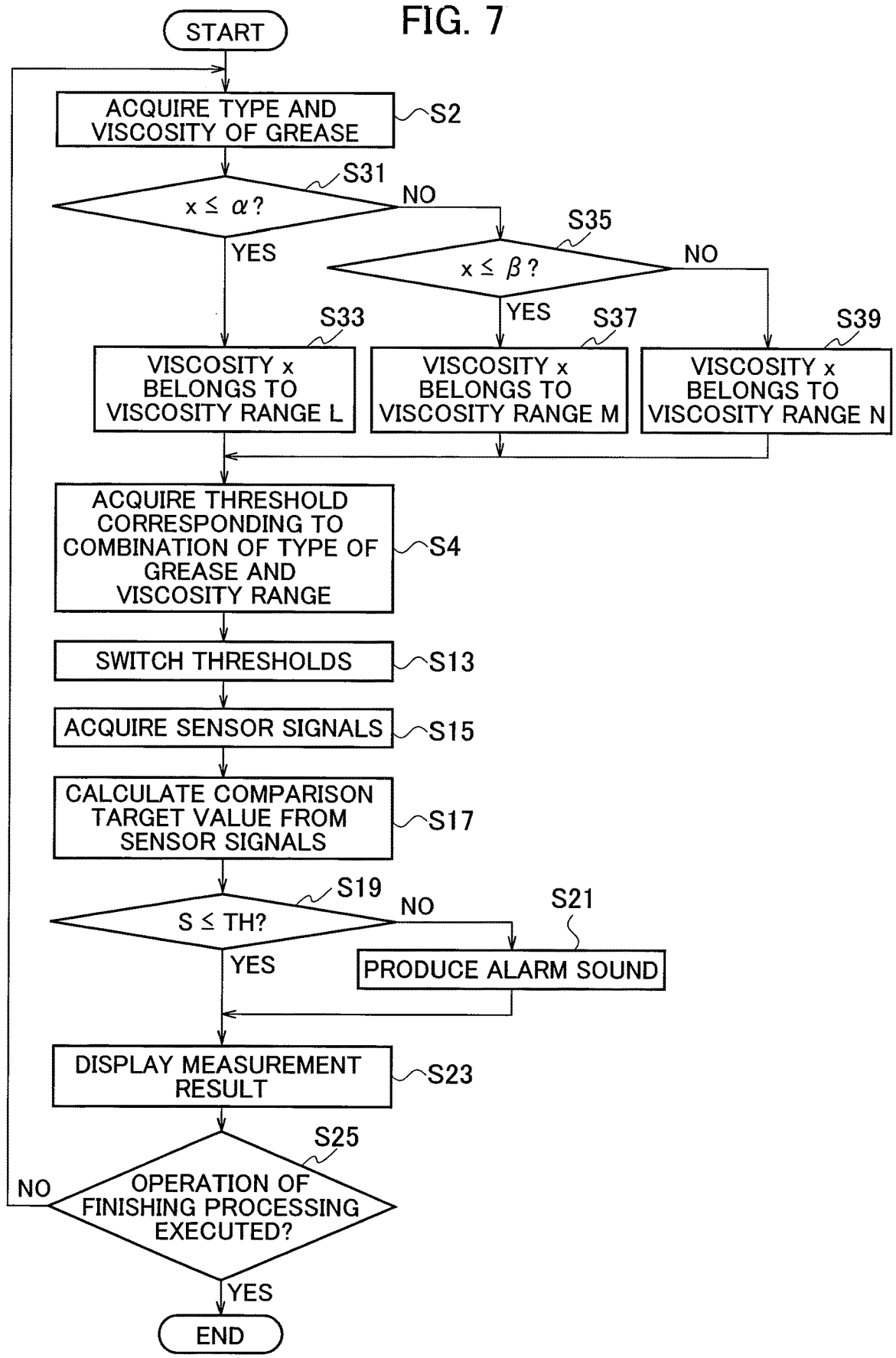
FIG. 7 is a flowchart showing a process performed by a calculation processing unit 13 in the second example.

FIG. 7 is a flowchart illustrating a process performed by the calculation processing unit 13 in the second example.

The threshold acquisition unit 132 of the calculation processing unit 13 first acquires the grease information from the grease information acquisition unit 14. The grease information includes the type of grease and the viscosity of grease. The threshold acquisition unit 132 acquires the type of grease and the viscosity of grease (S2).

For example, the viscosity is included in the grease information, as a value indicating the properties of grease (called catalog specifications), stored in the maintenance record or the work robot 2, and the grease information acquisition unit 14 acquires the grease information including the viscosity. The viscosity may be measured by a viscosity sensor or the like attached adjacent to the motor 21 or the speed reducer 22. The grease information acquisition unit 14 acquires, as the grease information, the actual viscosity measured by the viscosity sensor when the work robot 2 is actually operating.

Namely, the viscosity used may be the catalog specifications, or may be the actual viscosity when the work robot 2 is actually operating.

The threshold acquisition unit 132, when acquiring the viscosity, determines whether the viscosity acquired (hereinafter referred to as the viscosity x) is equal to or lower than the boundary value α (S31). The threshold acquisition unit 132 determines that the viscosity x, when equal to or smaller than the boundary value α (S31: YES), belongs to the viscosity range L (S33).

The threshold acquisition unit 132 determines whether the viscosity x is equal to or smaller than the boundary value β (S35) when the viscosity x is greater than the boundary value α (S31: NO). The threshold acquisition unit 132 determines that the viscosity x, when equal to or smaller than the boundary value β (S35: YES), belongs to the viscosity range M (S37). The threshold acquisition unit 132 determines that the viscosity x, when greater than the boundary value β (S35: NO), belongs to the viscosity range N (S39).

The threshold acquisition unit 132 acquires, from the storage unit 18, the threshold set for the corresponding combination of the acquired grease type and the determined viscosity range after the processing in steps S33, S37, and S39 (S4). For example, when the type of grease is type A and the viscosity x belongs to the viscosity range N, the threshold acquisition unit 132 acquires, from the storage unit 18, the threshold TH13 corresponding to the combination of type A and the viscosity range N (S4).

The following processing is the same as that after the step S13 in the first example, and overlapping explanations are not repeated below. When the processing in step S 25 is determined not to be performed yet, the process returns to step S2.

The reason for classifying the viscosity ranges as described above is that the viscosity herein refers to the actual value of the viscosity in use, and is thus not constant. Another reason is that there are many possible values for the viscosity, regardless of the viscosity referring to the catalog specifications.

When the viscosity refers to the catalog specifications but the number of the possible values is small, for example, when the grease with the viscosity other than viscosity x1, x2, or x3 is not used, the threshold is only required to be stored in the storage unit 18 in association with the combination of the type and the viscosity (any of x1, x2, and x3) of grease used.

As described above, the control unit (13) in the second example acquires the viscosity of the lubricant in addition to the type of the lubricant (S2), and varies the threshold depending on the type and the viscosity of the lubricant (S4), namely, sets the threshold in accordance with the type and the viscosity of the lubricant. A malfunction of the apparatus thus can be detected in accordance with the determination criteria corresponding to the type and the viscosity of the lubricant used for the movable parts in the apparatus.

Since the second example increases the threshold when the size of the data (S) increases due to the use of the corresponding viscosity of the lubricant, regardless of the same type of lubricant, a wrong malfunction determination and a false alarm can be prevented.

Since the second example decreases the threshold when the size of the data (S) decreases due to the use of the corresponding viscosity of the lubricant, regardless of the same type of lubricant, a wrong malfunction determination and a miss of detection of a malfunction can be prevented.

Third Example

A third example is described below. The elements different from those in the first example are mainly described below, and overlapping explanations of the same or similar contents are not repeated below.

Figure 8:
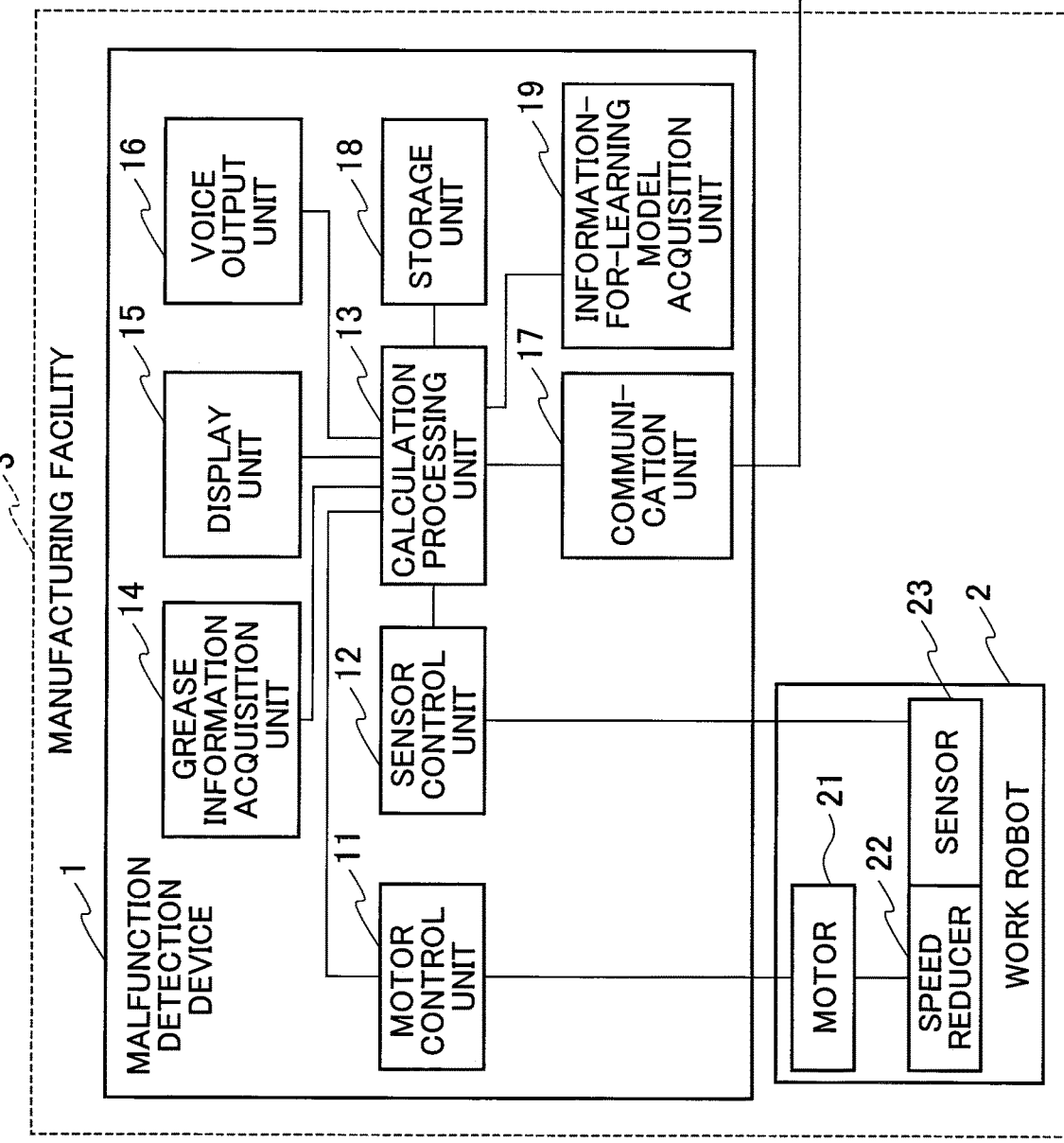
FIG. 8 is a diagram illustrating a configuration of a system including a malfunction detection device according to a third example.

FIG. 8 is a diagram illustrating a configuration of a system including a malfunction detection device in the third example.

The malfunction detection device 1 in the third example includes an information-for-learning model acquisition unit 19, in addition to the motor control unit 11, the sensor control unit 12, the calculation processing unit 13, the grease information acquisition unit 14, the display unit 15, the voice output unit 16, the communication unit 17, and the storage unit 18.

The information-for-learning model acquisition unit 19 acquires information for generating a learning model (described in detail below), in particular, acquires pieces of information on the operations that the work robot 2 has executed before, and is an Internet-of-Things (IoT) sensor arranged adjacent to the movable parts which are the motor 21 and the speed reducer 22, for example. The IoT sensor is a collective name for a plurality of sensors attached to the target apparatus to send pieces of data to an external apparatus via, for example, a wireless LAN. The information-for-learning model acquisition unit 19 may be a device for acquiring information for controlling the movable parts stored in the work robot 2, or a device for acquiring information for controlling the movable parts from maintenance data stored in an apparatus other than the work robot 2.

The information-for-learning model acquisition unit 19 herein acquires values t, e, and w, which are described in the following cases (1) to (3), and outputs the values to the calculation processing unit 13: (1) the value t is a value regarding a total operating time of the work robot 2, a total suspension time of the work robot 2, a continuous operating time during which the work robot 2 continuously operates, and operating information on other circumferential apparatuses; (2) the value w is a value regarding an operating load level indicating a load of operation acting on the work robot 2, a speed of operation of the work robot 2, and required accuracy of operation; and (3) the value e is a value regarding a temperature around the work robot 2 or a variation or an inclination of variation of the temperature, a humidity or a variation or an inclination of variation of the humidity, and a magnitude of vibrations in the surroundings.

These values t, w, and e are the information for generating the learning model described below. The information for generating the learning model is not limited to the values t, w, and e, and may be any other information varying depending on the performance or used conditions of the apparatus. For example, the information used includes hours or intensity of sunlight.

FIG. 9 is a diagram illustrating the information stored in the storage unit 18 in the third example.

The storage unit 18 in the third example stores the learning models in association with the corresponding type of grease. The storage unit 18 stores a learning model P1 in association with the grease of type A, stores a learning model P2 in association of the grease of type B, and stores a learning model P3 in association with the grease of type C. The respective learning models differ from each other in the contents which depend on the type of grease. The storage unit 18 can switch the learning model used for the malfunction detection between the learning models P1 to P3.

FIG. 10 is a diagram illustrating an example of the learning model.

For example, the learning model P1 includes parameters acquired when the work robot 2 using the grease of type A causes no malfunctions in the past, and parameters acquired when the work robot 2 using the grease of type A has any malfunctions in the past.

The parameters acquired when the work robot 2 causes no malfunctions (when in a normal state) include the value t, the value w, and the value e listed in a time-series order, and include the corresponding dates allotted to the respective values t, w, and e. The parameters acquired when the work robot 2 has malfunctions include the value t, the value w, and the value e listed in a time-series order, and include the corresponding dates allotted to the respective values t, w, and e.

The parameters acquired when the work robot 2 causes no malfunctions (when in the normal state) refer to the values acquired when, for example, the work robot 2 uses the grease of type A, and the process in step S19 in the flowchart described below is determined to be YES (to be in the normal state) by the calculation processing unit 13. The parameters acquired when the work robot 2 has malfunctions refer to the values acquired when the work robot 2 uses the grease of type A, and the process in step S19 in the flowchart described below is determined to be NO (to have a malfunction) by the calculation processing unit 13. The learning models herein can be referred to also as a history.

The learning model is not limited to that based on the determination result obtained by the calculation processing unit 13, and may be generated in accordance with the stored parameters acquired when the operator, for example, determined that the apparatus had no malfunctions in the past, and the stored parameters acquired when the operator confirmed the occurrence of malfunctions in the past.

Although not illustrated, the learning model P2 is a learning model acquired when the grease of type B is used, and the learning model P3 is a learning model acquired when the grease of type C is used, both learning models having the same configuration as the learning model P1. The learning models are not limited to the table-like form, and may be indicated such that marks are allotted to the points of the respective values t, w, and e when in the normal state in a three-dimensional space including thee axes of the value t, the value w, and the value e, and are also allotted to the points of the respective values t, w, and e when having a malfunction, so as to set a boundary surface between the normal state and the malfunction.

Figure 11:
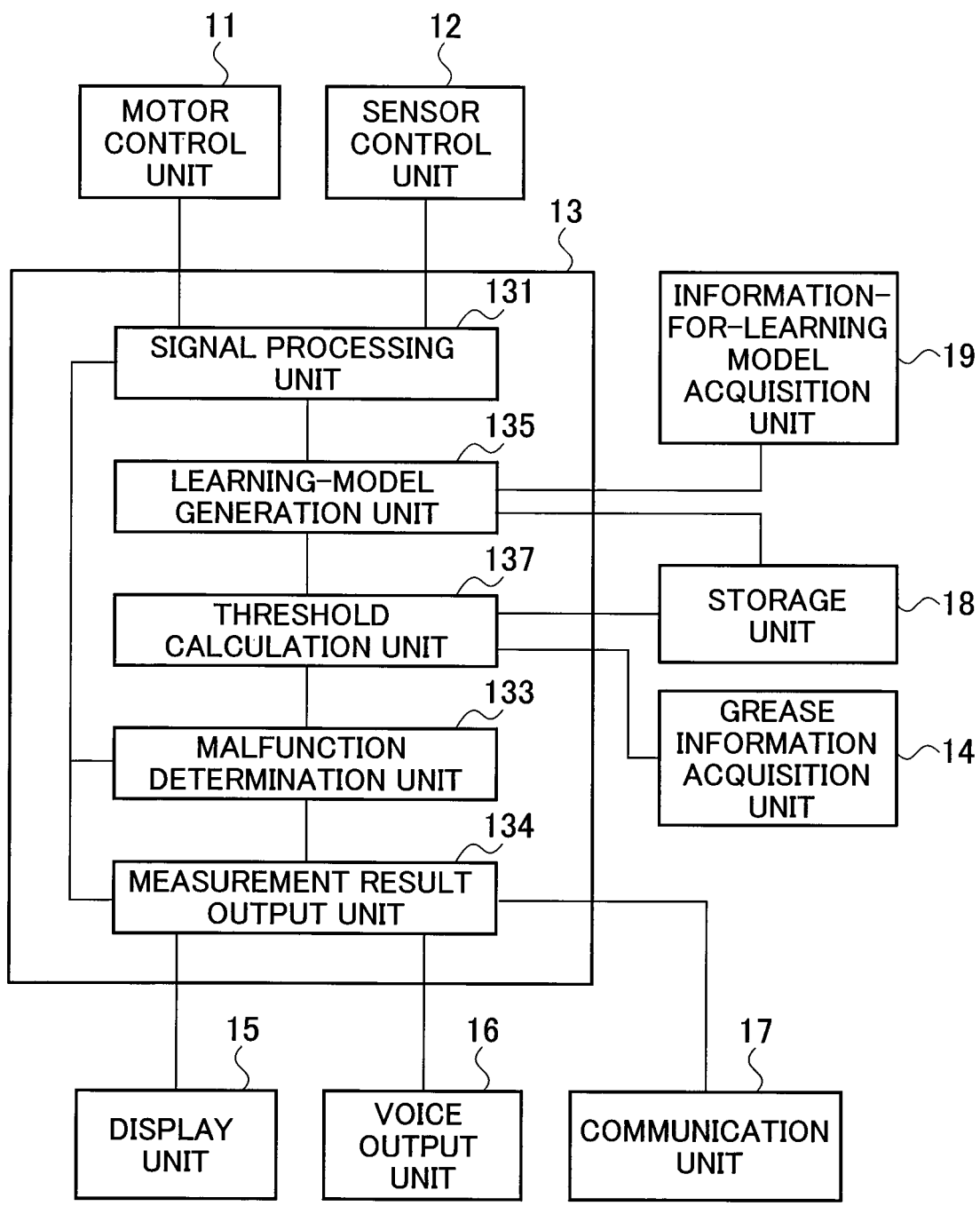
FIG. 11 is a block diagram illustrating a schematic configuration of a calculation processing unit 13 in the third example.

FIG. 11 is a block diagram illustrating a schematic configuration of the calculation processing unit 13 in the third example.

The calculation processing unit 13 includes a learning-model generation unit 135 in addition to the signal processing unit 131, the malfunction determination unit 133, and the measurement result output unit 134, and further includes a threshold calculation unit 137 instead of the threshold acquisition unit 132 illustrated in FIG. 4.

The learning-model generation unit 135 acquires the value t, the value w, and the value e, and the dates from the information-for-learning model acquisition unit 19, and generates the learning models as illustrated in FIG. 10 in the storage unit 18.

The threshold calculation unit 137 chooses the learning model when using the corresponding type of lubricant acquired from the grease information acquisition unit 14, and applies a learning algorithm to the chosen learning model to obtain a threshold. The specific explanations will be made below.

Figure 12:
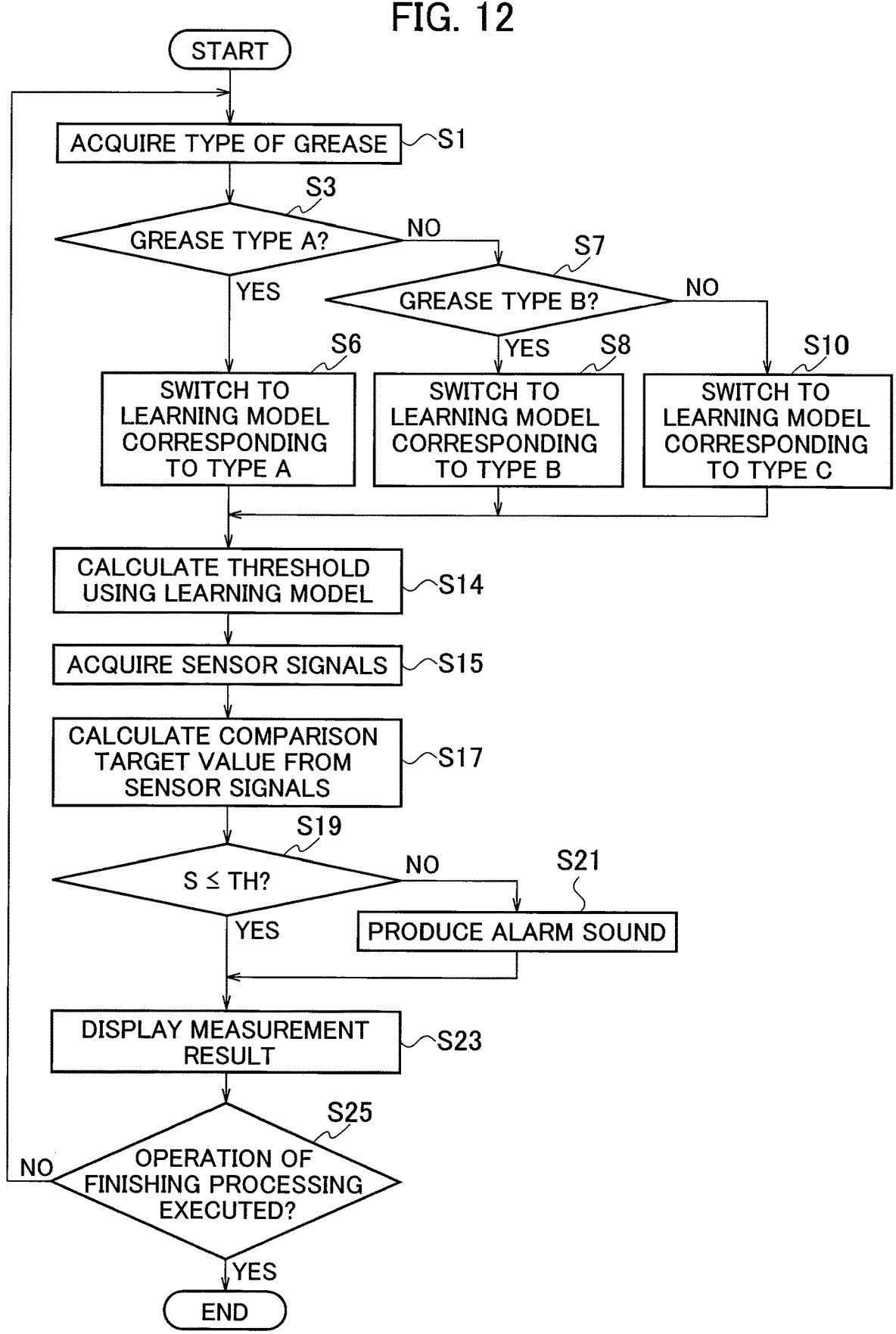
FIG. 12 is a flowchart showing a process performed by the calculation processing unit 13 in the third example.

FIG. 12 is a flowchart illustrating a process performed by the calculation processing unit 13 in the third example.

The threshold calculation unit 137 of the calculation processing unit 13 first acquires the grease information (the type of grease) from the grease information acquisition unit 14 (S1).

The threshold calculation unit 137 then determines whether the type of grease acquired is type A (S3). When the type of grease acquired is type A (S3: YES), the storage unit 18 switches the learning model used for the malfunction detection to the learning model P1 corresponding to type A (S6).

The threshold calculation unit 137 determines whether the type of grease acquired is type B (S7) when the type of grease acquired is not type A (S3: NO). When the type of grease acquired is type B (S7: YES), the learning model used for the malfunction detection is switched to the learning model P2 corresponding to type B (S8). The threshold calculation unit 137 causes the learning model used for the malfunction detection to be switched to the learning model P3 corresponding to type C (S10) when the type of grease acquired is not type B (S7: NO). The threshold calculation unit 137 calculates a threshold (referred to below as a "threshold TH") (S14) by use of the learning model after being switched in step S6, S8, or S10.

In step S14, the threshold calculation unit 137 calculates a value t (referred to below as a "value T") at the boundary between the case in which the work robot 2 is in the normal state and the case in which the work robot 2 has a malfunction, based on the value t upon the normal state and the value t upon the malfunction. For example, the threshold calculation unit 137 calculates an average ta1 of the values t when the work robot 2 is in the normal state, and calculates an average ta2 of the values t when the work robot 2 has any malfunctions, so as to obtain the average of the average ta1 and the average ta2 as the value T. Alternatively, a median of the average ta1 and the average ta2 may be used as the value T.

The threshold calculation unit 137 also calculates a value w (referred to below as a "value W") at the boundary between the case in which the work robot 2 is in the normal state and the case in which the work robot 2 has a malfunction, in the same manner as the case of calculating the value T from the values t. Similarly, the threshold calculation unit 137 also calculates a value e (referred to below as a "value E") at the boundary between the case in which the work robot 2 is in the normal state and the case in which the work robot 2 has a malfunction. The respective values T, W, and E can be referred to also as a threshold for determining whether the work robot 2 is in the normal state or has a malfunction.

The threshold calculation unit 137 then substitutes the respective values T, W, and E for a predetermined learning model formula (mathematical formula) so as to calculate the threshold TH. For example, the threshold calculation unit 137 substitutes the respective values T, W, and E for the learning model formula as represented by the following formula 1 to calculate the threshold TH:

$$TH = T \times X + W \times Y + E \times Z + c \quad \text{(formula 1)}$$

where X, Y, Z, and c are constants.

Alternatively, the threshold calculation unit 137 substitutes the respective values T, W, and E for the learning model formula as represented by the following formula 2 to calculate the threshold TH:

$$TH = (T \times X)2 + W \times Y + E \times Z + c \quad \text{(formula 2)}$$

where X, Y, Z, and c are constants.

The above formulae are preliminarily set in the threshold calculation unit 137 so as to calculate the threshold TH such that the comparison target value S is to be greater than the threshold TH when the work robot 2 has a malfunction. The work robot 2 thus can be determined to have a malfunction when the comparison target value S is greater than the threshold TH, and the work robot 2 can be determined to be in the normal state when the comparison target value S is equal to or smaller than the threshold TH.

As described above, the method of calculating the values T, W, and E using the learning model after being switched and substituting the calculated values T, W, and E for the above formula so as to obtain the threshold, is referred to as the application of the learning algorithm to the learning model. Namely, the third example applies the learning algorithm to the learning model including the parameters regarding the apparatus acquired when the apparatus using the lubricant of the acquired type causes no malfunctions in the past, and parameters regarding the apparatus acquired when the apparatus using the lubricant of the acquired type has any malfunctions in the past so as to obtain the threshold.

The learning model formula is not limited to the linear equation as represented by the formula 1 or the quadratic equation as represented by the formula 2, and may be a cubic or greater equation. The learning model formula may also be a formula using an exponential function or a logarithm. The learning model formula thus can be any formula that can be described mathematically.

The above example is illustrated with the case of calculating the respective thresholds in step S14 based on the learning model switched in step S6, S8, or S10, but is not limited to this case.

For example, the data including the respective learning models using the grease of each of type A, type B, and type C may be analyzed by machine learning or deep learning so as to generate a normal determination model or a malfunction determination model of the grease of each of type A, type B, and type C.

For example, the normal determination model or the malfunction determination model for the grease of type A is chosen, which is generated as a result of analysis of the learning model corresponding to the grease of type A by the machine learning or the deep learning in the step after the type of the grease is determined to be type A in step S3.

The signal of the sensor is then acquired in step S15, and the value of the sensor signal is compared with the normal determination model or the malfunction determination model for the grease of type A in step S19 (described in more detail below), so as to determine the presence or absence of a malfunction. The same processing is also applied to the case of using the grease of type B and type C.

The normal determination model or the malfunction determination model includes at least one threshold in predetermined parameters, so as to compare the corresponding threshold with the value of the sensor signal.

The normal determination model or the malfunction determination model, each being the determination model, is stored in the storage unit 18.

Since the storage unit 18 is used in which the determination models for determining a malfunction for each type of lubricant are stored, the control unit switches the determination models depending on the type of lubricant used for the movable parts in the apparatus so as to vary the threshold. The use of the determination models enables the detection of a malfunction of the apparatus with a higher accuracy, so as to prevent a false alarm and a miss of detection of a malfunction more reliably.

The respective determination models are generated through the analysis of the data on the condition of a part of the apparatus by the machine learning technique. The analysis by the machine learning technique can detect a malfunction of the apparatus with a higher accuracy, so as to prevent a false alarm and a miss of detection of a malfunction more reliably.

The following process is the same as that after step S15 in the first example, and overlapping explanations are not made below.

According to the third example described above, the control unit (13) applies the learning algorithm to the learning model including the parameters regarding the apparatus acquired when the apparatus using the lubricant of the acquired type causes no malfunctions in the past, and parameters regarding the apparatus acquired when the apparatus using the lubricant of the acquired type has any malfunctions in the past so as to obtain the threshold. Namely, the control unit (13) sets the threshold acquired by applying the learning algorithm to the learning model.

A malfunction of the apparatus thus can be detected by use of the parameters other than the type and the viscosity of the lubricant, which include the value regarding the operating time and the like of the apparatus, the value regarding the load and the like of the operation performed by the apparatus, and the value regarding the surroundings around the apparatus, for example. This enables the detection of a malfunction of the apparatus with a higher accuracy, so as to prevent a false alarm and a miss of detection of a malfunction more reliably.

Since the third example also increases the threshold when the size of the data (S) on the condition at a particular part of the apparatus increases, a wrong malfunction determination and a false alarm can be prevented.

Since the third example also decreases the threshold when the size of the data (S) on the condition at the particular part of the apparatus decreases, a wrong malfunction determination and a miss of detection of a malfunction can be prevented.

Modified Example of Third Example

The third example has been illustrated above with the case of preliminarily storing the learning models in association with each type of grease in the storage unit 18, choosing the learning model corresponding to the type of grease used, and applying the learning algorithm to the chosen learning model so as to obtain the threshold. A further advancement of the third example may be made as follows.

In particular, a modified example of the third example preliminarily stores the learning models in association with the combination of each type and viscosity of grease in the storage unit 18, choosing the learning model corresponding to the combination of the type and the viscosity of grease used, and applying the learning algorithm to the chosen learning model so as to obtain the threshold.

The learning models stored in the storage unit 18 each include the parameters regarding the apparatus acquired when the apparatus using the lubricant with the type and the lubricant set for the corresponding learning model causes no malfunctions in the past, and parameters regarding the apparatus acquired when the apparatus using the lubricant with the type and the lubricant set for the corresponding learning model has any malfunctions in the past so as to obtain the threshold.

To obtain the combination of the type and the viscosity of grease used, the process in steps S2, S31, S33, S35, S37, and S39 may be executed.

The modified example of the third example, which chooses the learning model set for the corresponding combination of the type and the viscosity of grease used, and applies the learning algorithm to the chosen learning model to obtain the threshold, thus can detect a malfunction of the apparatus in accordance with the determination criteria corresponding to the combination of the type and the viscosity of the lubricant used.

Figure 13:
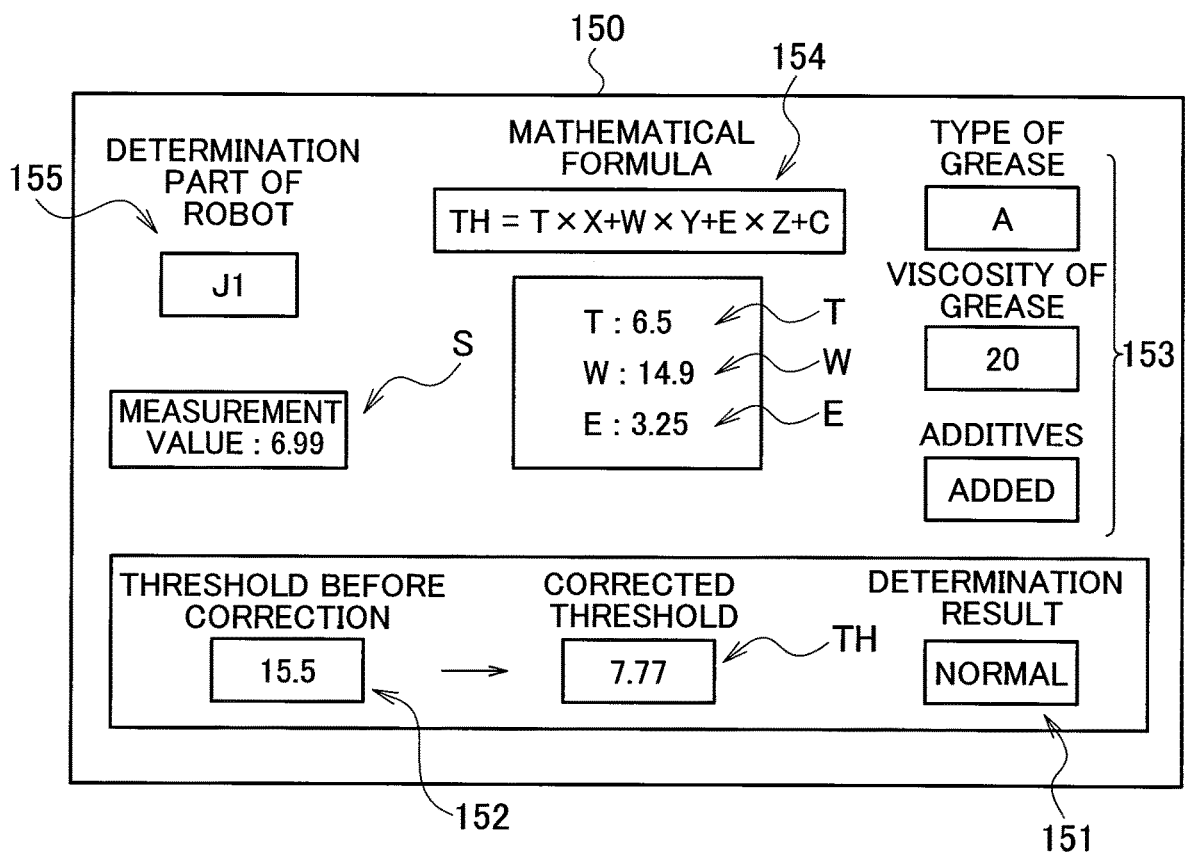
FIG. 13 is a diagram illustrating a displaying example of a measurement result 150.

FIG. 13 is a diagram illustrating a displaying example of the measurement result 150. The display unit 15 and the computer 5 display images as the measurement result 150 as illustrated in FIG. 13, for example. FIG. 13 illustrates the displaying example in the third example.

When the work robot 2 is determined to be in the normal state in step S19, for example, display information 151 indicating that the work robot 2 is in the normal state is displayed as the measurement result 150 on the displaying regions of the display unit 15 and the computer 5. When the work robot 2 is determined to have a malfunction, information indicating that the work robot 2 has a malfunction is displayed.

The threshold TH and the comparison target value S (the measurement value) used for the determination in step S19 are also displayed as the measurement result 150. In addition, display information 152 is also displayed indicating a threshold when grease of standard type is used. When this threshold is defined as a threshold before correction, the threshold TH can be referred to as a corrected threshold. Displaying the threshold before correction and the corrected threshold enables the confirmation that the threshold before correction is changed to the corrected threshold.

In addition, display information 153 indicating the type of grease, the viscosity of grease, and the presence or absence of additives used in the work robot 2 is also displayed as the measurement result 150. This enables the confirmation of the type of grease, the viscosity of grease, and the presence or absence of additives used.

In addition, display information 154 indicating the mathematical formula (the learning model formula) used for calculating the threshold TH is displayed as the measurement result 150. The values T, W, and E substituted for the formula are also displayed. This enables the confirmation of the learning model formula and the values substituted for the learning model formula used.

In addition, display information 155 is also displayed indicating the arrangement position of the motor 21 and the speed reducer 22 as a target for the malfunction determination. This enables the confirmation of the arrangement position of the motor 21 and the speed reducer 22.

FIG. 13 is the displaying example used in the third example, and the display information 154 and the values T, W, and E are not displayed in either the first example or the second example.

As described above, the calculation processing unit 13 controls the display unit 15 and the computer 5 to display, on the displaying regions, the measurement result 150 including the result of determination of whether the apparatus has a malfunction, in addition to the type of grease acquired, so as to allow the operator in the manufacturing facility and the observing person and the maintenance person who observe the apparatus to confirm the type of grease and further confirm whether the apparatus has a malfunction or is in the normal state, so as to do maintenance upon the occurrence of a malfunction of the apparatus.

The measurement result 150 also enables the recognition of how the threshold is changed due to the type and the viscosity of the lubricant, the influence by additives, and the switch between the learning models.

Displaying the arrangement position of the movable parts, the comparison target value S, the learning model formula, the values substituted for the learning model formula, and the result of the malfunction determination, can notify the operator, the maintenance person, or the observing person of the result of the malfunction detection more clearly. This increases the reliability of the system, and facilitates the action for dealing with the malfunction when caused in the apparatus.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

The apparatus as a determination target regarding a malfunction and the type of the malfunction is not limited to the work robot 2. For example, an engine of a vehicle instead of the motor or a transmission instead of the speed reducer may be applicable as a target. Any of apparatuses including movable parts, in particular, a movable part of a moving object, a moving object such as playground equipment in an amusement park, and a work machine such as a three-dimensional printer, may be a target to be determined. Any other types of apparatus may also be a target to be determined.

The malfunction detection device 1 may be installed in a remote place, as in the case of the computer 5, to receive/send necessary signals or data via a communication line so as to detect a malfunction of the apparatus. The functional block including the motor control unit 11, the sensor control unit 12, the calculation processing unit 13, the grease information acquisition unit 14, the communication unit 17, and the information-for-learning model acquisition unit 19, may be implemented by a computer.

The malfunction detection by the malfunction detection device 1 may also be applied to a prediction or an estimation of a breakdown. For example, when the time from an occurrence of a malfunction to a breakdown is already known, the detection of the malfunction can be the prediction or the estimation of the breakdown.

The respective functions described in the respective embodiments can be implemented in single or plural processing circuits. The respective processing circuits include a programmed processing device, such as a processing device including an electric circuit. The processing device includes an application-specific integrated circuit (ASIC) configured to execute the functions described in the embodiment or conventional circuit components.

REFERENCE SIGNS LIST

1 MALFUNCTION DETECTION DEVICE
2 WORK ROBOT (APPARATUS)
11 MOTOR CONTROL UNIT
12 SENSOR CONTROL UNIT
13 CALCULATION PROCESSING UNIT (CONTROL UNIT)
14 GREASE INFORMATION ACQUISITION UNIT
15 DISPLAY UNIT
16 VOICE OUTPUT UNIT
17 COMMUNICATION UNIT
18 STORAGE UNIT
19 INFORMATION-FOR-LEARNING MODEL ACQUISITION UNIT
21 MOTOR (MOVABLE PART)
22 SPEED REDUCER (MOVABLE PART)
23 SENSOR (VIBRATION SENSOR)
131 SIGNAL PROCESSING UNIT
132 THRESHOLD ACQUISITION UNIT
133 MALFUNCTION DETERMINATION UNIT
134 MEASUREMENT RESULT OUTPUT UNIT
135 LEARNING-MODEL GENERATION UNIT
137 THRESHOLD CALCULATION UNIT
150 MEASUREMENT RESULT
201 ROTATING AXIS
A, B, C TYPE OF GREASE
x, x1, x2, x3 VISCOSITY OF GREASE
L, M, N VISCOSITY RANGE
TH, TH1, TH2, TH3, TH11, TH12, TH13, TH21, TH22, TH23, TH31, TH32,
TH33 THRESHOLD
S COMPARISON TARGET VALUE
P1, P2, P3 LEARNING MODEL
t, w, e VALUE (PARAMETER)
T, W, E VALUE
X, Y, Z, c CONSTANT
ta1, ta2 AVERAGE VALUE
α, β BOUNDARY VALUE

The invention claimed is:

1. A malfunction detection device comprising:
a control unit for detecting a malfunction of an apparatus including a movable part in accordance with detected data on a condition at a predetermined part of the apparatus, the detected data is calculated according to at least one of a vibration signal indicating a magnitude of vibration and a driving force signal indicating a driving force; and
a storage unit in which a determination model for determining a malfunction for each type of the lubricant is stored,
the control unit being configured to:
compare the detected data on the condition at the predetermined part with a predetermined threshold to determine a malfunction of the apparatus;
acquire a type of a lubricant used for the movable part of the apparatus, and vary the threshold in accordance with the acquired type of the lubricant; and
switch the determination model in accordance with the acquired type of the lubricant used for the moveable part of the apparatus so as to vary the threshold.

2. The malfunction detection device according to claim 1, wherein the control unit further acquires viscosity of the lubricant, and varies the threshold depending on the type of the lubricant and the viscosity of the lubricant.

3. The malfunction detection device according to claim 1, wherein the control unit causes an image to be displayed indicating whether the apparatus has a malfunction, together with the acquired type of the lubricant.

4. The malfunction detection device according to claim 1, wherein the determination model is generated through analysis of the data on the condition at the predetermined part by a machine learning technique.

* * * * *